(12) United States Patent
Blue et al.

(10) Patent No.: US 9,021,605 B2
(45) Date of Patent: Apr. 28, 2015

(54) METHOD AND SYSTEM FOR PROTECTING SENSITIVE DATA IN A PROGRAM

(75) Inventors: George Meldrum Blue, Southampton (GB); John James Ralph Scott, Durham (GB); Jamie Peter Squibb, Hampshire (GB); Philip Graham Willoughby, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 2248 days.

(21) Appl. No.: 11/968,258

(22) Filed: Jan. 2, 2008

(65) Prior Publication Data
US 2008/0163382 A1 Jul. 3, 2008

(30) Foreign Application Priority Data
Jan. 3, 2007 (EP) ..................... 07100058

(51) Int. Cl.
*G06F 21/00* (2013.01)
*G06F 12/14* (2006.01)
*G06F 9/44* (2006.01)
*G06F 21/62* (2013.01)

(52) U.S. Cl.
CPC .............. *G06F 12/1491* (2013.01); *G06F 8/31* (2013.01); *G06F 21/62* (2013.01); *G06F 21/6281* (2013.01)

(58) Field of Classification Search
CPC .................................................. G06F 21/6281
USPC ........................................................... 726/28
See application file for complete search history.

(56) References Cited

U.S. PATENT DOCUMENTS

| | | | |
|---|---|---|---|
| 5,870,467 A | 2/1999 | Imai et al. | |
| 6,272,631 B1 | 8/2001 | Thomlinson et al. | |
| 6,745,307 B2* | 6/2004 | McKee | 711/163 |
| 6,779,114 B1* | 8/2004 | Chow et al. | 713/189 |
| 6,895,556 B1 | 5/2005 | Kaply et al. | |
| 7,117,328 B2 | 10/2006 | Shibuya et al. | |
| 2003/0056115 A1 | 3/2003 | Falkenberg | |
| 2004/0003278 A1 | 1/2004 | Chen et al. | |
| 2004/0010701 A1 | 1/2004 | Umebayashi et al. | |
| 2008/0059473 A1* | 3/2008 | Yamaguchi et al. | 707/9 |

OTHER PUBLICATIONS

"Taint Checking," http://en.wikipedia.org/wiki/Taint_checking, 2006, pp. 1-3.

* cited by examiner

*Primary Examiner* — Longbit Chai
(74) *Attorney, Agent, or Firm* — Winstead, P.C.

(57) ABSTRACT

To protect sensitive data in program code, a method includes providing a programming interface with a capability of allocating a protected region of memory which can only be accessed by authorized code. Sensitive data present in program code is stored in the protected region of memory. The method includes marking parts of code in a program as authorized or not authorized to access the sensitive data, and determining if that part of a program which is executing is authorized to access protected data by reference to the marking.

20 Claims, 3 Drawing Sheets

METHOD AND SYSTEM FOR PROTECTING SENSITIVE DATA IN A PROGRAM

FIELD OF THE INVENTION

This invention relates to the field of protection of sensitive data in programs. In particular, it relates to restricting access to sensitive data in programs.

BACKGROUND

Many programs handle sensitive data which must be protected. Examples of sensitive data include but are not limited to passwords, cryptographic keys, personal information, any data or information which an organization or individual considers to be confidential, restricted, protected or secret, or any information that is required to be protected by law.

As well as being protected from access by sources external to a program, such sensitive data must not accidentally be disclosed by the program or routine itself. Programs typically put out information in a variety of different ways, which include but are not limited to logging, interaction with the user, displaying of messages, printing information out, and saving information to disk or a similar non-volatile medium. It is possible for sensitive information to be disclosed through any of these means. An accidental disclosure occurs when sensitive information is disclosed when the program design did not mean for it to be disclosed. Accidental disclosure is most likely to occur if an error condition occurs because programs typically output large amounts of information when an error occurs in order to aid resolution of the problem. Some programs may also have an ability to record what happens to data inside the program as it runs, which is usually called trace.

It is possible through careful programming to ensure that every part of a program or routine is incapable of accidentally disclosing sensitive information; however this requires the programmer to know how every part of the program will behave in every situation, including all interactions with program libraries, other programs, the operating system and the computer hardware. This checking is very costly for a large program, and is also intrinsically dangerous because any small error could allow the sensitive information to be disclosed accidentally.

SUMMARY

An aim of the present invention is to ensure that no sensitive data is disclosed except where a programmer has specifically allowed it to be disclosed.

According to a first aspect of the present invention there is provided a method for protecting data in program code, comprising: a programming interface providing a capability of allocating a protected region of memory which can only be accessed by authorized code; and storing sensitive data present in program code in the protected region of memory.

The method may include marking parts of code in a program as authorized or not authorized to access the sensitive data, and determining if that part of a program which is executing is authorized to access protected data by reference to the marking. The marking parts of code may be by means of a programming language keyword or an administrative command. Any modification to the authorized program code may automatically cause it to be marked as not authorized. A modification may be detected by means of comparing a value determined by a program size and content to a value obtained using the same method at the time the program was marked as authorized.

The programming language may include a function to enable the authorization of code to be checked at runtime of a code before exposing the sensitive data. The function may be activated by attempted access of sensitive data by code in the program itself or by code external to the program. Unauthorized access of sensitive data by code may trigger a trap.

Unauthorized code may be allowed to manipulate pointers to the protected region of memory, but it is not allowed to dereference any such pointers and thus access the sensitive data.

A programming language may provide a capability of applying a property to a data value in program code, the property indicating an authorization level. Each data value in a program may have a property indicating an authorization level from user level to supervisor level, and wherein sensitive data may have a property indicating supervisor level.

The data values may be stored in the memory regions at real addresses, and the method may include: runtime code requesting an operation on a virtual address; and converting the virtual address to a real address after checking the authorization level for access to a real address.

The method may include copying data from an unprotected region of memory to a protected region of memory. The method may also include copying data from a protected region of memory to an unprotected region of memory for editing and returning the data to a protected region of memory. The copying and returning may be carried out by programming language function calls, and the function calls may be disabled to prevent copying.

According to a second aspect of the present invention there is provided a system for protecting data values comprising: a processor; an operating system coupled to the processor; a memory including a protected region of memory which can only be accessed by authorized code; and a computer program stored on a computer readable storage medium, comprising computer readable program code including sensitive data stored in the protected region of memory. The processor may be a physical or virtual machine.

Each operating system process may be associated with a plurality of protected memory pages. Each protected memory page may be associated with a plurality of operating system processes.

The system may include means for marking parts of code in a program as authorized or not authorized to access the sensitive data, and means for determining if that part of a program which is executing is authorized to access protected data by reference to the marking.

The system may include a flag provided to indicate if a memory region is a protected memory region.

The system may include a trap generating means which forces a trap when an unauthorized code attempts to access a protected memory region.

In one embodiment, the memory includes a plurality of memory pages and the protected region of memory is one or more protected memory pages with a high privilege required for access.

BRIEF DESCRIPTION OF THE DRAWINGS

Embodiments of the present invention will now be described, by way of examples only, with reference to the accompanying drawings in which.

DETAILED DESCRIPTION

A method and system for protecting sensitive data in a computer program or routine are described.

Figure 1:
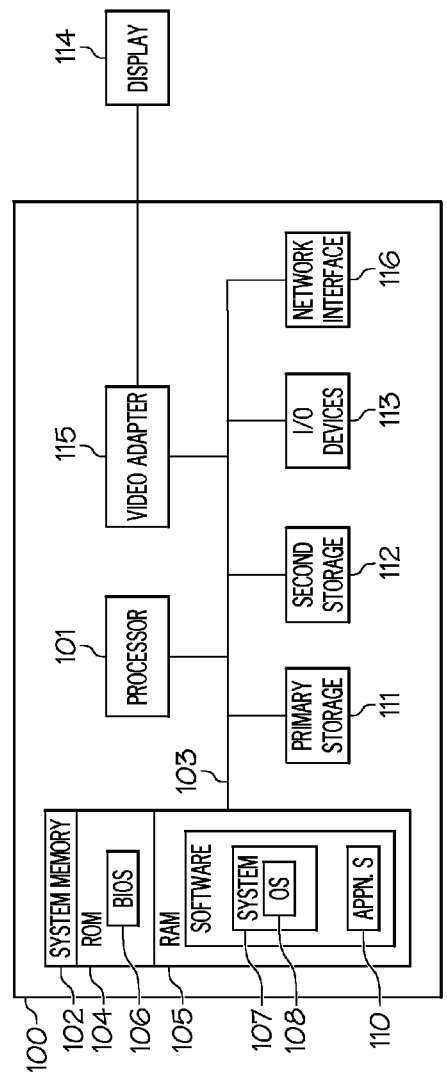
FIG. 1 is a block diagram of a computer system in which the present invention may be implemented.

Referring to FIG. 1, an exemplary system for implementing the described method and system includes a data processing system 100 suitable for storing and/or executing program code including at least one processor 101 coupled directly or indirectly to memory elements through a bus system 103. The memory elements can include local memory employed during actual execution of the program code, bulk storage, and cache memories which provide temporary storage of at least some program code in order to reduce the number of times code must be retrieved from bulk storage during execution.

The memory elements may include system memory 102 in the form of read only memory (ROM) 104 and random access memory (RAM) 105. A basic input/output system (BIOS) 106 may be stored in ROM 104. System software 107 may be stored in RAM 105 including operating system software 108. Software applications 110 may also be stored in RAM 105.

The system 100 may also include a primary storage means 111 such as a magnetic hard disk drive and secondary storage means 112 such as a magnetic disc drive and an optical disc drive. The drives and their associated computer-readable media provide non-volatile storage of computer-executable instructions, data structures, program modules and other data for the system 100. Software applications may be stored on the primary and secondary storage means 111, 112 as well as the system memory 102.

The computing system 100 may operate in a networked environment using logical connections to one or more remote computers via a network adapter 116.

Input/output devices 113 can be coupled to the system either directly or through intervening I/O controllers. A user may enter commands and information into the system 100 through input devices such as a keyboard, pointing device, or other input devices (for example, microphone, joy stick, game pad, satellite dish, scanner, or the like). Output devices may include speakers, printers, etc. A display device 114 is also connected to system bus 103 via an interface, such as video adapter 115.

A hardware virtual machine may be provided on the computer system 100 which enables a number of discrete execution environments to be provided on a single computer, each of which runs an operating system.

The software applications 110 may include an application virtual machine, which is a piece of computer software that isolates the application being used by the user from the computer. Because versions of the application virtual machine are written for various computer platforms, any application written for the application virtual machine can be operated on any of the platforms, instead of having to produce separate versions of the application for each computer and operating system.

Figure 2:
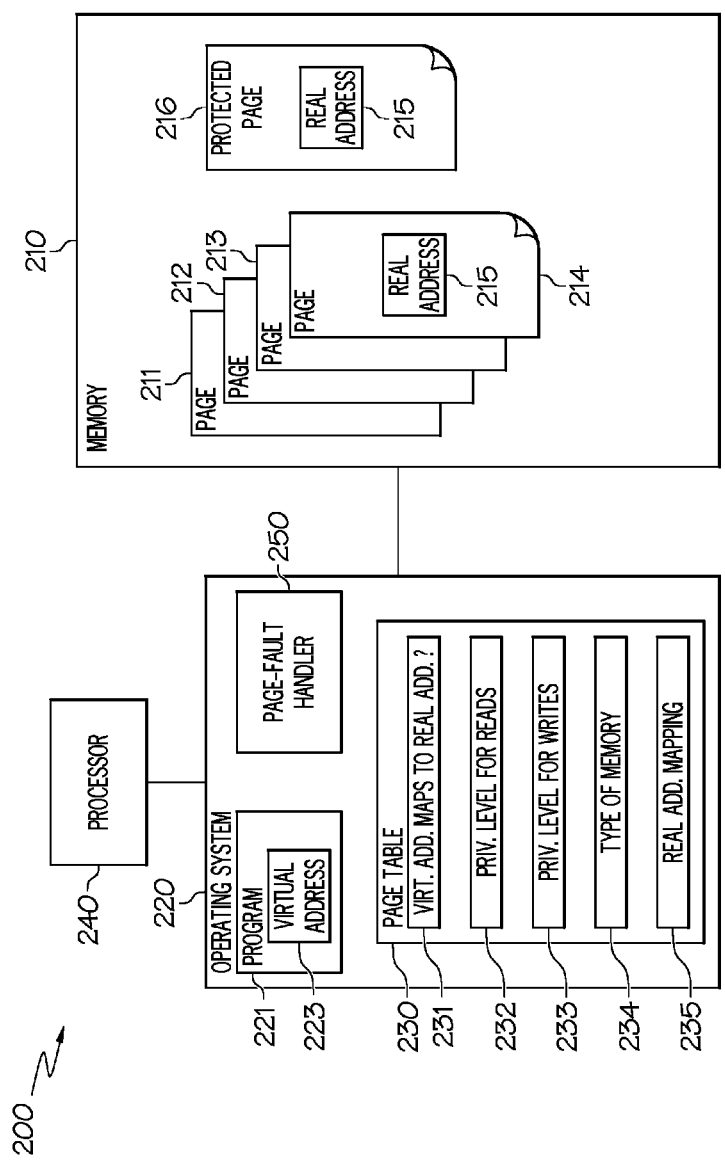
FIG. 2 is a schematic diagram of a memory management system in accordance with the present invention.

Referring to FIG. 2, a schematic diagram showing memory management of volatile memory in a computer system 200. An operating system 220 includes programs 221 which run processes which access data from memory 210. Memory 210 is divided into units called pages 211-214. The operating system 220 may be a real or virtual operating system.

Processes running in an operating system 220 operate on virtual addresses 223. When a program 221 asks to do an operation on a virtual address 223 the processor 240 must convert it to a real address 215. It does this by looking up the page address in an operating-system maintained piece of real memory called a page table 230. The page table 230 contains the following information:
1) Whether this virtual address page maps directly to a real address 231;
2) At what privilege level this virtual address page is readable 232;
3) At what privilege level this virtual address page is writable 233;
4) The type of memory of this virtual address 234;
5) The real address of this virtual address page, if (1) is true 235.

For a requested operation, it is first checked if bit (1) is set to true indicating that the virtual address page maps directly to a real address. If so, it is then checked if the current privilege level is equal to or higher than the privilege level in (2) for a read operation, or the privilege level in (3) for a write operation. If the privilege level is acceptable, the type of memory in (4) is checked to be compatible with the requested operation. If it is compatible, the processor 240 executes the requested operation mapping to the real address provided in (5).

Otherwise, the processor 240 invokes a piece of privileged operating-system code called a page-fault handler 250. The page-fault handler 250 determines the cause of the fault and decides what to do.

There are typically three options if a page-fault hander 250 is invoked:
1) Modify the page-table so that the operation would now succeed and restart the process which caused the trap at the instruction which caused the trap.
2) Simulate the effect of the operation and restart the process which caused the trap, just after the instruction which trapped.
3) Inform the process which caused the trap that it cannot do the required operation and restart it. Usually this is done with a signal like SIGSEGV (signal for "segmentation violation") or SIGBUS (signal for bus error "access to undefined portion of memory object").

At runtime, the described method and system of sensitive data protection puts all the protected variables into pages 216 which are designated for protection by the operating system 220. The operating system 220 will maintain the page table 230 in such a way that all accesses to these addresses cause the page-fault handler 250 to be invoked.

A process may need to protect more than one page 216 of data and so there may be multiple protected pages 216 of data for a single process.

An operating system 220 may elect to put protected information from multiple processes in a single protected page 216 for space-efficiency reasons.

In one embodiment, the read-privilege level 233 of the page 216 of protected data is set to require kernel-level (or supervisor-level) access. This is implemented as a runtime check rather than a compile-time modification to the code. It may be necessary to alter other parts of the operating system to respect the intent of this mark.

Figure 3:
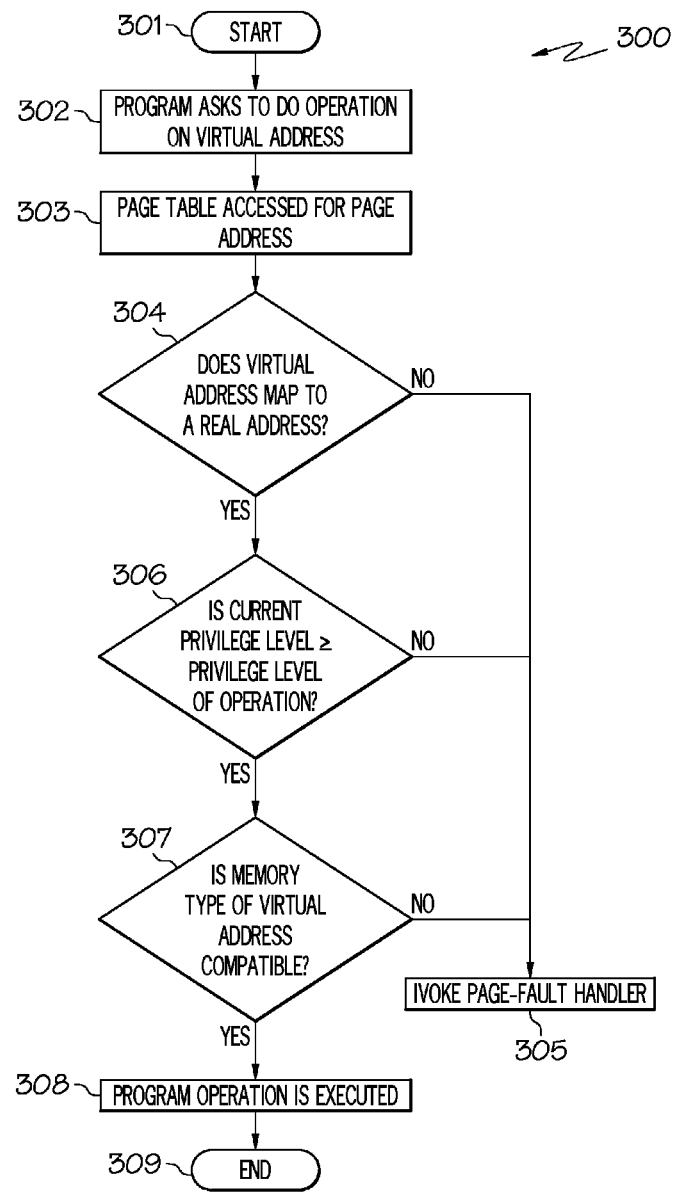
FIG. 3 is a flow diagram of a method in accordance with an aspect of the present invention.

Referring to FIG. 3, a flow diagram 300 shows a method of protecting sensitive data. The method starts 301 and a program asks to do an operation on a virtual address 302. The page table is accessed 303 for the page address. It is determined 304 if the virtual address maps to a real address. If not, the page-fault handler is invoked 305.

If the virtual address does map to a real address, it is then determined 306 if the current privilege level is greater than or equal to the privilege level for the read or write operation designated in the page table. If not, the page-fault handler is invoked 305. If the real address is in a protected page with a high kernel-level access, the page-fault handler will be invoked.

If the current privilege level is greater than or equal to the privilege level for the operation, it is then determined 307 if the type of memory of the virtual address is compatible. If not, the page-fault handler is invoked 305.

If the virtual address is compatible, the program operation is executed 308 and the method ends 309.

The method can be implemented at runtime with no cost to unprotected variables by using hardware features of many modern processors which support virtual memory.

Unprotected variables would continue to work as they always have, but protected variables would be allocated in a different page (or pages) of the process's address space. The page or pages of protected variables would always be marked as unavailable by the processor, so any attempt to access them would trigger a trap. Supervisor level software would then need to check that the code which is trying to access the protected data is marked as safe to do so. If it is, it should allow the operation to proceed, otherwise it should trigger an exception. The exception could be a signal indicating an invalid memory reference, for example, raising a SIGSEGV (signal for segmentation violation) against the calling process.

An existing flag may be used to force a trap. Alternatively, a new flag may be added to all memory pages which indicates whether or not the page is protected.

This works well for small accesses, but for large structures a method is provided for copying data to an unprotected space for editing before copying it back.

In the described system, every access (either read or write) to a protected page causes a page-fault; therefore, an authorized programmer might choose to copy the data to an unprotected page (an unsecured structure) before editing. This would improve execution speed by avoiding the page-faults. The programmer would then copy the data back to the protected page afterwards. This could be done programmatically via a function call to "unsecure" the data and a subsequent function call to "re-secure" the data provided as language constructs. The "re-secure" function call should overwrite the data in the unsecured structure after copying it back to the secured structure.

The action of copying the protected data to an unprotected page may be disabled "system wide" for highly sensitive data. It may also be disabled for a particular process or any other logical unit or group of logical units. In this case, the two function calls do nothing. This should not prevent the program from working, but it will obviously have an impact on performance.

The described method and system is provided at the processor level, although it could be at a higher level on true virtual machines. The method and system protect the program itself by making use of the memory management available on certain processors. The memory management facility of such processors is used to provide a facility which can provide a very high level of protection for confidential information within a program, protecting the program from other parts of itself. This may be implemented as a language construct or by any other means.

An example embodiment of an implementation is given in this C interface:

```
void *malloc_secure(size_t size);        // Like malloc()
void free_secure(void *start_of_allocated buffer); // Like free()
void *memcpy_secure(void * restrict dest, const void * restrict src, size_t size);
                                          // Like memcpy()
void mark_code_secure(void *start, size_t length); // This
function allows the runtime linker to tell the operating system
which functions are safe
```

A Java-like language might add a keyword 'secure' which marks variables as needing to be in secure storage and functions as being allowed to manipulate them:

```
secure String password = "SwordFish"; // Must result in calls to
allocate_secure( ) and memcpy_secure( ) at runtime
(hardcoding must not be done)
    secure void login(/* . . . */, String pw, /* . . . */) // Assuming basic
assembler layout is in use this will result in mark_code_secure(login,
main - login); at runtime
{
    /* . . . */
    String cpw = pw.clone( );            // must call memcpy_secure( )
                                          to
get an 'untainted' copy of the password
    loginstream.print(cpw);              // because loginstream.print
                                          (pw);
would fail cpw.destroy( );
    /* . . . */
}
int main (/* . . . */)
{
    login(/* . . . */, password, /* ... */);      // Should work
    System.out.println("Password is: " + password); // Should throw
some kind of Runtime Exception
    password.destroy( );                 // must call free_secure( ) }
```

Note that the login( ) function does not require its password parameter to be in secure memory. It will work either way, which makes migrating to this scheme easier. Non-secure functions are allowed to manipulate pointers to secure memory, but they are not allowed to dereference them. This means that you can put secure variables into standard collection classes, providing they do not depend on the variable's content.

It may be unnecessary to implement the memcpy_secure function; the supervisor could identify that memcpy( ) is the function which triggered the trap then look at the return instruction pointer to see if it points into a region which is marked secure.

This implementation will protect against accidental disclosure of sensitive information. It will not protect secure-tagged information from an attacker who can introduce arbitrary code. However, if this were implemented as part of an appropriately configured Trusted Computing Platform installation in which code cannot be added or modified without the proper authorization, it would be secured against attackers as an attacker would not be able to introduce code to circumvent the security measure.

Parts of code in a program are marked as authorized or not authorized to access the sensitive data. The marking may be by means of, for example, a programming language keyword or an administrative command. Any modification to an authorized program code automatically causes it to be marked as not authorized. The modification can be detected by comparing a value determined by the program's size and content to a value obtained using the same method at the time the code was marked as authorized. If the values differ, the program code has been modified and loses its authorization to access the sensitive data. It is determined if that part of a program which is executing is authorized to access protected data by reference to the authorization marking.

A property is set on all data values to state whether or not they are sensitive. The property on the data values could default to a state tailored by the programmer; they may choose whether or not the data is sensitive. Functions (including those built-in to the language and execution environment) would then check this data property before either displaying/passing it on.

This reduces the risk of data exposure because it is built-in to the language and does not require as much programmer coding. For example, if the language's printing function obeyed this the programmer would not have to check every time they called it. User-defined functions could obey the same convention.

The advantage of the described method and system is that it ensures that sensitive information will not be accidentally accessed or output in any way by security ignorant code. This may be important in highly security-sensitive environments.

The described method and system stop all of the program from accessing sensitive information except parts which the programmer and security administrator have specifically authorized to access the sensitive information. As a result of this, it is much easier to check for errors in the areas of the program which handle sensitive information. This approach is also intrinsically safe as an error cannot result in the disclosure of sensitive information unless error-handling code has been authorized to disclose the sensitive information.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

What is claimed is:

1. A method for protecting data in program code, comprising:
   a programming interface providing a capability of allocating a protected region of memory which can only be accessed by authorized code;
   storing sensitive data present in program code in the protected region of memory; and
   marking parts of code in a program as authorized or not authorized to access the sensitive data, and determining if that part of a program which is executing is authorized to access protected data by reference to the marking.

2. A method as claimed in claim 1, wherein the marking parts of code is by means of a programming language keyword or an administrative command.

3. A method as claimed in claim 2, wherein any modification to the authorized program code automatically causes it to be marked as not authorized.

4. A method as claimed in claim 3, wherein a modification is detected by means of comparing a value determined by a program size and content to a value obtained using the same method at the time the program was marked as authorized.

5. A method as claimed in claim 1, wherein the programming language includes a function to enable the authorization of code to be checked at runtime of a code before exposing the sensitive data.

6. A method as claimed in claim 5, wherein the function is activated by attempted access of sensitive data by code in the program itself or by code external to the program.

7. A method as claimed in claim 1, wherein unauthorized access of sensitive data by code will trigger a trap.

8. A method as claimed in claim 1, wherein unauthorized code is allowed to manipulate pointers to the protected region of memory, but it is not allowed to dereference any such pointers and thus access the sensitive data.

9. A method as claimed in claim 1, wherein a programming language provides a capability of applying a property to a data value in program code, the property indicating an authorization level.

10. A method as claimed in claim 9, wherein each data value in a program has a property indicating an authorization level from user level to supervisor level, and wherein sensitive data has a property indicating supervisor level.

11. A method as claimed in claim 10, wherein the data values are stored in the memory regions at real addresses, and the method includes:
    runtime code requesting an operation on a virtual address; and
    converting the virtual address to a real address after checking the authorization level for access to a real address.

12. A method as claimed in claim 1, including copying data from an unprotected region of memory to a protected region of memory.

13. A method as claimed in claim 1, including copying data from a protected region of memory to an unprotected region of memory for editing and returning the data to a protected region of memory.

14. A method as claimed in claim 13, wherein the copying and returning are carried out by programming language function calls, and wherein the function calls can be disabled to prevent copying.

15. A system for protecting data values comprising:
    a processor, wherein the processor is a physical or virtual machine;
    an operating system coupled to the processor;
    a memory including a protected region of memory which can only be accessed by authorized code;
    a computer program stored on a computer readable storage device, comprising computer readable program code including sensitive data stored in the protected region of memory; and
    means for marking parts of code in a program as authorized or not authorized to access the sensitive data, and means for determining if that part of a program which is executing is authorized to access protected data by reference to the marking.

16. A system as claimed in claim 15, including a flag provided to indicate if a memory region is a protected memory region.

17. A system as claimed in claim 16, including a trap generating means which forces a trap when an unauthorized code attempts to access a protected memory region.

18. A system as claimed in claim 17, wherein the memory includes a plurality of memory pages and the protected region of memory is one or more protected memory pages with a high privilege required for access.

19. A computer program product embodied in a computer readable storage medium, wherein the medium does not include a propagating signal, for protecting data in program code, the computer program product comprising the programming instructions for:
   providing a capability of allocating a protected region of memory which can only be accessed by authorized code;
   storing sensitive data present in program code in the protected region of memory; and
   marking parts of code in a program as authorized or not authorized to access the sensitive data, and determining if that part of a program which is executing is authorized to access protected data by reference to the marking.

20. The computer program product as recited in claim 19 further comprising the programming instructions for:
   copying data from a protected region of memory to an unprotected region of memory for editing and returning the data to a protected region of memory.

* * * * *